(12) United States Patent
Mosgaard

(10) Patent No.: US 10,244,334 B2
(45) Date of Patent: Mar. 26, 2019

(54) BINAURAL HEARING AID SYSTEM AND A METHOD OF OPERATING A BINAURAL HEARING AID SYSTEM

(71) Applicant: WIDEX A/S, Lynge (DK)

(72) Inventor: Lars Dalskov Mosgaard, Copenhagen (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 15/727,139

(22) Filed: Oct. 6, 2017

(65) Prior Publication Data

US 2018/0103327 A1 Apr. 12, 2018

(30) Foreign Application Priority Data

Oct. 10, 2016 (DK) .................................. 2016 00608

(51) Int. Cl.
*H04R 25/00* (2006.01)
*H04M 1/725* (2006.01)
*H04W 4/80* (2018.01)

(52) U.S. Cl.
CPC ...... *H04R 25/552* (2013.01); *H04M 1/72591* (2013.01); *H04R 25/554* (2013.01); *H04R 25/407* (2013.01); *H04R 2225/43* (2013.01); *H04W 4/80* (2018.02)

(58) Field of Classification Search
None
See application file for complete search history.

(56) References Cited

U.S. PATENT DOCUMENTS

| 2010/0135500 A1* | 6/2010 | Derleth ............... H04R 25/552 |
| | | 381/23.1 |
| 2016/0066104 A1 | 3/2016 | Minnaar |
| 2017/0002886 A1 | 1/2017 | Tomita |

FOREIGN PATENT DOCUMENTS

| EP | 2 039 217 A1 | 3/2009 |
| EP | 2 629 551 A1 | 8/2013 |
| EP | 2 649 812 B1 | 6/2014 |
| EP | 2 993 219 A1 | 3/2016 |
| WO | 01/01731 A1 | 1/2001 |
| WO | 2010/115227 A1 | 10/2010 |

OTHER PUBLICATIONS

International Search Report with Written Opinion dated Jan. 4, 2018, issued by the International Searching Authority in application No. PCT/EP2017/075282.
Baljeet Rana et al., "Better-ear glimpsing at low frequencies in normal-hearing and hearing-impaired listeners," J. Acoust. Soc. Am., Aug. 2016, pp. 1192-1205, vol. 140, No. 2.
Danish Search Opinion issued in PA 2016 00608 dated Apr. 28, 2017.
Danish Search Report issued in PA 2016 00608 dated Apr. 28, 2017.

* cited by examiner

*Primary Examiner* — Paul W Huber
(74) *Attorney, Agent, or Firm* — Sughrue Mion, PLLC

(57) ABSTRACT

A method of operating a binaural hearing aid system in order to provide an Interaural Level Difference (ILD) that is artificially increased beyond that provided naturally by the head shadow of the hearing aid system user and a binaural hearing aid system (100) for carrying out the method.

21 Claims, 5 Drawing Sheets

BINAURAL HEARING AID SYSTEM AND A METHOD OF OPERATING A BINAURAL HEARING AID SYSTEM

The present invention relates to binaural hearing aid systems. The present invention also relates to a method of operating a binaural hearing aid system.

BACKGROUND OF THE INVENTION

Generally a hearing aid system may be any system which provides an output signal that can be perceived as an acoustic signal by a user or contributes to providing such an output signal, and which has means which are used to compensate for an individual hearing loss of the user or contribute to compensating for the hearing loss of the user or contribute to compensating for the hearing loss. These systems may comprise hearing aids which can be worn on the body or on the head, in particular on or in the ear, and can be fully or partially implanted. However, some devices whose main aim is not to compensate for a hearing loss, may also be regarded as hearing aid systems, for example consumer electronic devices (televisions, hi-fi systems, mobile phones, MP3 players etc.) provided they have, however, measures for compensating for an individual hearing loss.

Within the present context a hearing aid may be understood as a small microelectronic device designed to be worn behind or in the human ear by a hearing-impaired user. The hearing aid may be powered by a battery or some other energy source. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor, and an acoustic output transducer. The signal processor is preferably a digital signal processor. The hearing aid is enclosed in a casing suitable for fitting behind or in a human ear. For this type of traditional hearing aids the mechanical design has developed into a number of general categories. As the name suggests, Behind-The-Ear (BTE) hearing aids are worn behind the ear. To be more precise, an electronics unit comprising a housing containing the major electronics parts thereof is worn behind the ear, and an earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In some modern types of hearing aids a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids. It has been suggested to design RITE or RIC hearing aids, wherein only the ear parts comprise at least one microphone. Another category of hearing aids is characterized in that at least one microphone is arranged in each of a behind the ear part and an earpiece part. In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids. This type of hearing aid requires an especially compact design in order to allow it to be arranged in the ear canal, while accommodating the components necessary for operation of the hearing aid.

Generally a hearing aid system may comprise a single hearing aid (a so called monaural hearing aid system) or comprise two hearing aids, one for each ear of the hearing aid user (a so called binaural hearing aid system). Furthermore the hearing aid system may comprise an external device, such as a smart phone having software applications adapted to interact with the other devices of the hearing aid system.

It is well known within the art of hearing aid systems that so called binaural cues are important in order to understand speech in noisy environments. Inter-aural Level Difference (ILD) is one type of binaural cue and Inter-aural Time Difference (ITD) is another.

In the article "Better-ear glimpsing at low frequencies in normal-hearing and hearing-impaired listener", by Rana and Buchholz, published in J. Acoust. Soc. Am. 140 (2), August 2016, pages 1192-1205, it is shown that artificially generated ILDs at low frequencies may improve speech understanding in noise. The article suggests that artificially created ILDs may be provided by directional hearing aid microphones, but also states that neither the optimal directivity nor the required number and placement of microphones to achieve the optimal directivity is known.

It is well known within the art of hearing aid systems to provide hearing aids with directional capabilities. Normally this is achieved by using two or more microphones to permit the hearing aid to process incoming sounds according to direction of incidence in order to achieve increased sensitivity towards sound coming from a particular direction, or range of directions. In this process the hearing aid relies on differences in arrival time and sound level among the microphones. A hearing aid with a directional capability allows a hearing aid user to perceive a sound coming from a particular direction, while sounds from other directions are suppressed to some extent. This may be useful to improve speech perception in noisy environments, especially environments where human speech may be received simultaneously from different directions, as is the case e.g. in the sound environment frequently referred to as cocktail party. With a directional sound receiving characteristic, e.g., in the shape of a cardioid or hypercardioid characteristic, the speech intelligibility for the hearing aid user is improved by reduced perception of sound coming from the back and the sides of the user while maintaining the level of sound coming from the area in front of the user, where it is assumed that the desired speaker is located.

Normally the term "directivity" is used to signify the capability of a hearing aid to favor sound originating from a particular direction or range of directions over sound originating from other directions. Physically, the definition of hearing aid directivity is the ratio between the output level due to sound from the favored direction and the output level due to sound averaged over the integral from all other directions, typically expressed in dB.

WO 01/01731-A1 discloses a method for controlling the directional characteristic of a hearing aid. The directional characteristic may be created by adjusting a delay in the signal processor to be the same as the acoustical delay between the back microphone and the front microphone, whereby signals that are first received at the back microphone and later received at the front microphone, after having propagated along the line between the front and back microphones, may be suppressed.

It is a feature of the present invention to provide a method of operating a binaural hearing aid system that increases the ILD.

It is another feature of the present invention to provide a binaural hearing aid system adapted to provide increased ILD.

SUMMARY OF THE INVENTION

The invention, in a first aspect, provides a method of operating a binaural hearing aid system comprising, in each hearing aid of the binaural hearing aid system, the steps of: providing an ipse-lateral input signal from an input transducer accommodated in an ipse-lateral hearing aid of the binaural hearing aid system; providing a contra-lateral input signal by wirelessly receiving an input signal from an input transducer accommodated in a contra-lateral hearing aid of the binaural hearing aid system; and combining the ipse-lateral and the contra-lateral input signal in order to provide a spatially processed signal; wherein the spatially processed signal is configured to provide a lower sensitivity for sounds incident from the direction towards the contra-lateral hearing aid as opposed to sounds incident from the directly opposite direction.

The invention, in a second aspect, provides a binaural hearing aid system comprising two hearing aids, wherein each hearing aid comprises: an acoustical-electrical input transducer, a binaural beam former, a digital signal processor, an electrical-acoustical output transducer and a wireless transceiver adapted to exchange signals with a contra-lateral ear-device of the binaural system, wherein the binaural beam former is adapted to provide a spatially processed signal and wherein the spatially processed signal is configured to provide a lower sensitivity for sounds incident from the direction of the contra-lateral ear device as opposed to sounds incident from the directly opposite direction.

Further advantageous features appear from the dependent claims.

Still other features of the present invention will become apparent to those skilled in the art from the following description wherein embodiments of the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects, all without departing from the invention. Accordingly, the drawings and descriptions will be regarded as illustrative in nature and not as restrictive. In the drawings.

DETAILED DESCRIPTION

Within the present context the term input signal is construed to mean an electrical signal, analogue or digital, which is provided from an acoustical-electrical input transducer and represents sound.

In the following the terms signal, electrical signal, analogue signal and digital signal may be used interchangeably.

In the present context Inter-aural Transfer Function (ITF) represents a function that describes how to derive a signal representing a sound picked up at or near one ear of an individual, from a signal representing the sound being picked up at or near the other ear of said individual.

In the present context the term spatial filtering is construed to mean the process of providing an electrical signal that is derived from an acoustical-electrical input transducer and whose characteristics depend on the direction of arrival (DOA) of the acoustical signal impinging on the input transducer. Basically, spatial filtering is always achieved when the signals, provided by two spaced apart input acoustical-to-electrical converter arrangements, are processed to result in a combined output signal based on constructive and destructive interference between the involved signals. In this respect it is noted that mixing of signals by adding the powers of the signals can't be considered spatial filtering because no form of constructive or destructive interference is involved. Within the present context the terms monaural beam forming and binaural beam forming represent special cases of the more general term spatial filtering.

Thus within the present context spatial filtering provides a hearing aid system with a directional capability, a directional pattern, a directional sound receiving characteristic or just a directional characteristic, wherein either of the above terms may be used interchangeably.

In the present context a beam former (BF) is construed to mean the components or apparatus required to carry out spatial filtering. A monaural beam former is configured to provide spatial filtering based only on input signals from a single hearing aid, while a binaural beam former (BBF) provides spatial filtering in both hearing aids of the binaural hearing aid system and also based on input signals from both hearing aids.

Figure 1:
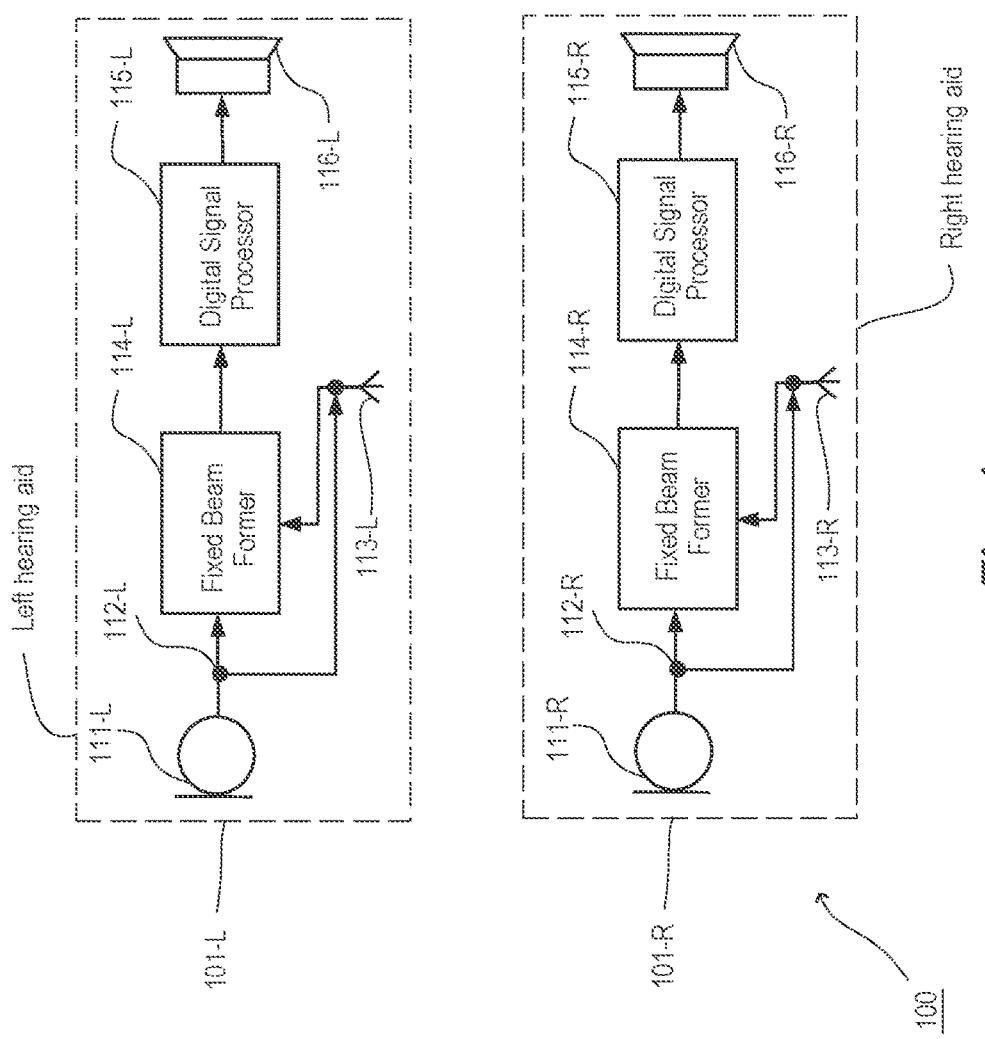
FIG. 1 illustrates highly schematically a binaural hearing aid system according to an embodiment of the invention.

Reference is first made to FIG. 1, which highly schematically illustrates a binaural hearing aid system 100 according to an embodiment of the invention.

The binaural hearing aid system 100 comprises a left hearing aid 101-L and a right hearing aid 101-R. Each of the hearing aids comprises at least one acoustical-electrical input transducer (that in the following may also be denoted a microphone or simply an input transducer) 111-L and 111-R, a signal splitter 112-L and 112-R, an inductive antenna 113-L and 113-R, a fixed beam former 114-L and 114-R, a digital signal processor 115-L and 115-R, and an electrical-acoustical output transducer 116-L and 116-R.

In each of the hearing aids 101-L/-R the acoustical-electrical input transducer 111-L/-R provides an electrical ipse-lateral input signal. The signal splitter 112-L/-R splits the ipse-lateral input signal and provides it to both the inductive antenna 113-L/-R and the fixed beam former 114-L/-R. The inductive antenna 113-L/-R provides that the ipse-lateral input signal is wirelessly transmitted from the ipse-lateral hearing and to the contra-lateral hearing aid.

When the ipse-lateral input signal is received by the contra-lateral hearing aid it is provided to the respective fixed beam former 114-L/-R there. Each of the fixed beam formers 114-L/-R is adapted to form a fixed directional pattern based on the input signals from both the hearing aids 101-L/-R, wherein the directional pattern has lower sensitivity in the direction towards the respective contra-lateral hearing aid 101-L/-R than in the direction pointing in the opposite direction, away from the contra-lateral hearing aid 101-L/-R. The resulting signal from the fixed beam former 114-L/-R (which in the following may be denoted the spatially processed signal) is provided to the digital signal processor 115-L/-R, which applies a frequency dependent gain in order to alleviate the hearing deficit of an individual. Finally the electrical output signal from the digital signal processor 115-L/-R is provided to the electrical-acoustical output transducer 116-L/-R for converting the electrical output signal into sound.

The fixed beam former 114-L/-R may be implemented in a number of different manners all of which will be well known for a person skilled in the art. Furthermore, the fixed directional pattern may be a cardioid or a hypercardioid or another directional pattern that is characterized in that the sensitivity is lower in the direction towards the contra-lateral hearing aid relative to the sensitivity in the direction pointing in the opposite direction, away from the contra-lateral hearing aid.

In an embodiment the fixed directional pattern is characterized by having at least one direction wherein the sensitivity has a minimum and pointing towards the half-space containing the contra-lateral hearing aid, wherein the half space is defined relative to the plane that is perpendicular to a line between the ears of the user wearing the binaural hearing aid system.

In an embodiment a filter bank is inserted before the fixed beam former 114-L/-R, whereby the fixed beam former may be implemented differently as a function of frequency.

As already disclosed a hearing aid 101-L/-R according to the invention may comprise more than one microphone 111-L/-R. In fact most contemporary hearing aids will have two microphones and for these cases the ipse- and contra-lateral signals provided to the fixed beam former 114-L/-R will be the output signal from a monaural beam former in the ipse- and contra-lateral hearing aid respectively.

Figure 2:
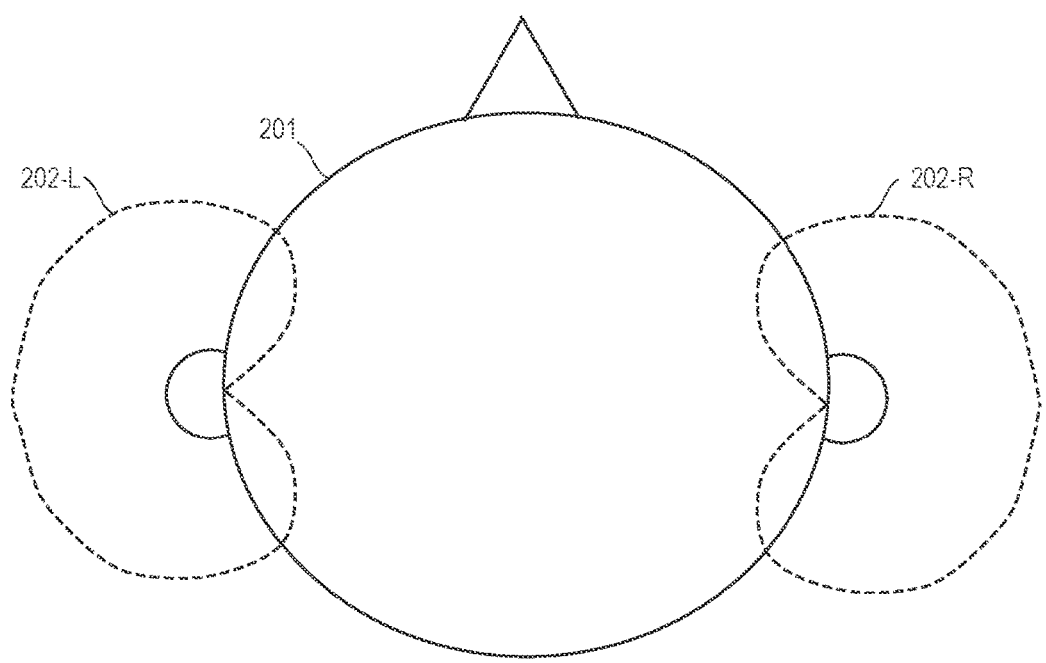
FIG. 2 illustrates highly schematically a directional pattern provided by a binaural hearing aid system according to an embodiment of the invention.

Reference is now given to FIG. 2, which illustrates highly schematically the head 201 of a hearing aid user, and the directional patterns 202-L and 202-R of the left and right hearing aids respectively according to an embodiment of the invention. It is noted that in this case the respective directions of minimum sensitivity point directly towards the respective contra-lateral hearing aid.

However, it has been found that in order to achieve precisely a desired directional pattern when the binaural hearing aid system is worn by a hearing aid system user it is required to take into account the diffraction of the sound waves around the head of the user.

Figure 3:
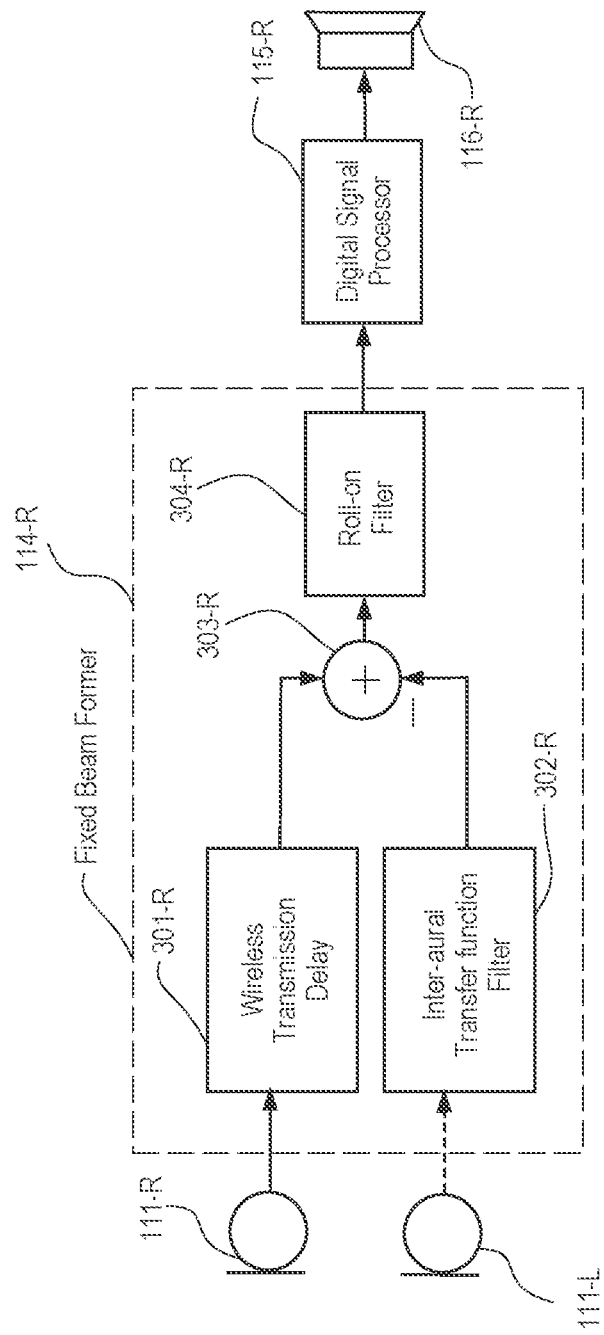
FIG. 3 illustrates highly schematically a fixed binaural beam former according to an embodiment of the invention.

Reference is therefore given to FIG. 3, which illustrates highly schematically how the fixed beam former 114-R in the right hearing aid may be implemented considering the diffraction effects. The fixed beam former 114-R receives input signals from both the ipse-lateral microphone 111-R (i.e. the microphone accommodated in the ipse-lateral hearing aid 101-R) and the contra-lateral microphone 111-L (i.e. the microphone accommodated in the contra-lateral hearing aid 101-R). The input signal from the ipse-lateral microphone 111-R is provided to a wireless transmission delay block 301-R that is adapted to provide a time delay that corresponds to the time delay introduced by wirelessly transmitting the input signal from the contra-lateral hearing aid and to the ipse-lateral hearing aid. The output signal from the delay block is subsequently provided to the signal adder 303-R. The input signal from the contra-lateral microphone 111-L is provided to an inter-aural transfer function filter 302-R and the output signal here from is subsequently provided to the signal adder 303-R and hereby subtracted from the output signal from the delay block 301-R. The output signal from the signal adder 303-R is provided to a filter 304-R that compensates for relative level changes as a function of frequency (the filter may also be denoted a roll-on filter), which may have been introduced by the beamforming. The output signal from the filter 304-R constitutes the output signal from the fixed beam former 114-R.

Obviously the fixed beam former 114-L in the left hearing aid is implemented in accordance with the same principle.

In an embodiment the transfer function H(s) of the inter-aural transfer function filter 302-R/-L may be given as:

$$H(s) = \frac{e^{-s\tau_{phase}}}{1 + 2s\tau_{amplitude}}$$

wherein the parameters $\tau_{phase}$ and $\tau_{amplitude}$ are used to take the head of the hearing aid system user into account. It has been found that the given transfer function provides a surprisingly precise approximation of the inter-aural transfer function especially in the frequency range between 200 Hz and up to 1.2 kHz. Thus it has been found that splitting of the parameter $\tau$ into a phase and amplitude part and allowing these two parts to be optimized independently has provided this advantageous inter-aural transfer function. Furthermore the inter-aural transfer function filter, according to the FIG. 3 embodiment, is advantageous in the present context because it only introduces a relatively short delay, in the order of 1 millisecond.

The given transfer function is also advantageous in that it may be expressed, in the continuous (Laplace transformation) domain, by a simple $1^{st}$ order Bessel filter and a frequency independent delay, which means that the implementation of the corresponding digital filter in the z-domain can be carried out in a simple manner using a bilinear transformation.

In an embodiment the transfer function of the inter-aural transfer function filter is obtained by selecting the position of a virtual sound source, and obtaining the two head related transfer functions for the respective ears, which two head related transfer functions subsequently are used to derive the inter-aural transfer function by dividing one with the other.

In an alternative embodiment of the FIG. 3 embodiment the inter-aural transfer function filter may be re-designed to filter the ipse-lateral input signal instead of the contra-lateral input signal. However, this embodiment is less advantageous because it requires a longer delay in the beam former.

The inter-aural transfer function filter 302-L/-R is configured to reflect the head size of the individual wearing the hearing aid system 100 and in an embodiment, the head size may be estimated during initial programming (which may also be denoted hearing aid fitting), and the inter-aural transfer function filter 302-L/-R derived based hereon. The estimation may be carried out by providing a distinguishable sound from a point on the line intersecting the two hearing aids of the binaural hearing aid system and at least a predetermined distance, such as half a meter, from the hearing aid system, and subsequently optimizing at least one parameter of the inter-aural transfer function, in order to minimize the spatially filtered signal, wherein the parameter represents the distance between the hearing aids of the binaural hearing aid system and whereby the distance between the hearing aids of the binaural hearing aid system may be estimated.

In another embodiment the binaural hearing aid system is adapted to allow the hearing aid system user to estimate the apparent current head size, which may be advantageous if the user is wearing e.g. a hat or has selected a hair style that affects the diffraction of the sound waves and which may be represented in the calculations by adding or subtracting from the normally estimated head size. According to one specific embodiment the binaural hearing aid system comprises an external device that is capable of prompting the user to hold out the external device in a proper position, as close as possible to the line intersecting the two hearing aids of the binaural hearing aid system and at least a predetermined distance from the hearing aid system, while a distinguishable sound is provided from the external device, and in response hereto optimizing at least one parameter of the inter-aural transfer function by the binaural hearing aid system, in order to minimize the spatially filtered signal, whereby the distance between the hearing aids of the binaural hearing aid system, when worn by a user, may be estimated.

In an embodiment the head size may be estimated to belong to one of a limited number of head size categories, whereby a predetermined inter-aural transfer function and hereby the filter 304-L/-R can be selected based on the head size category the hearing aid system user belongs to. In a specific embodiment, three different head size categories are available to select from.

In other embodiments, the filter 304-L/-R is derived based on the estimated head size or based on the selected head size category.

In an embodiment at least one of the ipse- and contra-lateral signals provided to the fixed beam former 114-R/-L may selectively be the result of various types of monaural beam forming, whereby the signals provided to the fixed beam former 114-R/-L may represent at least one type of directional characteristic selected from a group comprising an omni-directional, bi-directional or cardioid characteristic. Preferably the ipse- and contra-lateral input signals provided to the fixed beam former 114-R/-L will represent the same type of directional characteristic.

In case input signals representing e.g. a cardioid characteristic is selected instead of input signals representing e.g. an omni-directional characteristic it will be required to scale at least one of the input signals representing a cardioid characteristic before it is provided to the fixed beam former 114-R/-L or the wireless transmission delay block 301-R/-L in order to optimize the efficiency of the BBF.

It is especially advantageous to apply input signals representing a cardioid characteristic because this allows suppression of noise sources positioned behind the user wearing the hearing aid system while maintaining the improved ILD provided by the invention.

In an embodiment the delay of the wireless transmission delay block 301-R may be reduced by reducing correspondingly the frequency independent delay provided by the inter-aural transfer function filter 302-R.

However, it is noted that the ITD is maintained by the BBF according to the present invention as opposed to traditional BBFs that are designed to provide in each hearing aid of the binaural hearing aid system a directional pattern that is of the same type and oriented in the same direction in the two hearing aids, which effectively means that the user is provided with the same signal in each ear.

It is a specific advantage of the present invention that ITD is maintained while ILD is improved. This is advantageous because evidence suggests that ITD and ILD can work together to improve speech intelligibility.

In variations of the disclosed embodiments the antennas 113-L and 113-R need not be inductive but can instead be far-field radio antennae adapted for operating at e.g. 2.4 GHz, and in a specific variation the binaural hearing aid system 100 may comprise an external device adapted to relay the input signals between the hearing aids 101-L and 101-R of the binaural hearing aid system. Thus, the binaural hearing aid system may be set-up to exchange the input signals between the hearing aids such that the contra-lateral input signal is received either directly from the contra-lateral hearing aid or from the external device, when functioning as a relay device.

However, any suitable operating frequency or method for exchanging the input signals between the hearing aids can be used, all of which will be readily known by a person skilled in the art.

However, according to a variation of the FIG. 3 embodiment, the fixed beam former 114-R/-L comprises a wireless transmission quality detector that determines whether a wirelessly transmitted signal of sufficiently good quality has been received, and, if this is not the case, sets the inter-aural transfer function filter 302-R/-L to zero, such that the output signal from the filter 302-R/-L likewise is zero, whereby only the input signal from the ipse-lateral microphone 111-R/-L is provided to the signal adder 303-R/-L, and additionally sets the filter 304-R/-L to provide a frequency independent unity gain while maintaining the same phase response as before. Hereby a minimum of sound artefacts will be introduced in case the wireless signal transmission between the two hearing aids of the binaural hearing aid system is interrupted.

It is a specific advantage of embodiments according to the present invention that the directional patterns of the left and right (or ipse- and contra-lateral) hearing aids, when perceived by the hearing aid system user may provide something similar to an omni-directional pattern at least in so far that no sound from a specific direction is perceived as significantly suppressed because the brain combines the input from both ears.

The use of fixed directional patterns (as provided e.g. by the fixed beam formers 114-R/-L) is also specifically advantageous because they provide the hearing aid user with the perception of a relatively stable sound environment, which may improve listening comfort and lessen listening fatigue for at least some hearing aid users. However, despite these advantages the embodiments may additionally improve speech intelligibility, especially in highly fluctuating sound environments, such as e.g. the so-called cocktail party situation, because the brain is capable of directing its attention to the sound provided from either the left or the right hearing aid depending on where the best signal to noise ratio, and hereby also speech intelligibility, can be achieved. In fact it appears that this switching of attention can be carried out so fast that if a hearing aid user is facing a desired sound source in a frontal direction while two interfering speakers are positioned to the left and to the right, then the hearing aid user may benefit from this attention switching even if the interfering speakers are talking simultaneously because the switching is so fast the hearing aid user may benefit from the inherent pauses in speech.

However, in an embodiment, the BBF is configured to adaptively vary the sensitivity, as a function of sound incidence, in order to improve the signal-to-noise ratio of the spatially processed signal as long as the spatially processed signal provides a lower sensitivity for sounds incident from the direction of the contra-lateral hearing aid as opposed to sounds incident from the directly opposite direction. In another more specific embodiment the BBF is configured to adaptively vary the sensitivity, as a function of sound incidence by varying the position of the virtual sound source which is required in order to obtain the left and right head related transfer functions, which are used to derive the inter-aural transfer function. In an embodiment the position of the virtual sound source is varied only by changing the assumed direction of incidence onto the left and right ear respectively from the virtual sound source.

Principally the BBF in each of the two hearing aids may be adaptively varied independent on each other, but according to a specific embodiment the BBFs are only allowed to vary symmetrically, whereby a more stable sound environment will be perceived by the hearing aid system user.

Thus the BBF according to the present invention provides a simple manner of changing the directional beam pattern by moving the position of the virtual sound source around. According to an embodiment the inter-aural transfer functions corresponding to selected directional beam patterns may be stored in the hearing aid system, whereby on-line derivation may be dispensed with and the requirements to processing power hereby relieved.

According to another aspect of the present embodiment, the hearing aid system may be individualized in accordance with the hearing aid system user's preferences and/or cognitive abilities by varying the position of the virtual sound source required in order to obtain the left and right head related transfer functions, which are used to derive the transfer function for the inter-aural transfer function filter. This is advantageous because the relative strength of the ILD relative to the ITD may be changed by varying the position of the virtual source and hereby the inter-aural transfer function filter. As one example the inter-aural transfer function filter that provides a cardioid represents the configuration with maximum increase of the ILD.

In variations of the embodiments of the present invention, a sound environment classification is carried out using a classifier and based on the results of the classification the binaural beam former (BBF) may be activated, disabled or changed.

In an embodiment, the classifier is configured to evaluate whether the average sound pressure level exceeds a given threshold and in response hereto disable or change the BBF. The magnitude of the gain required to compensate for the possible low frequency roll-off in a BBF is low compared to the gain requirement for a traditional monaural beam former due to the longer distance between the input transducers. The lower gain is advantageous because it relieves the issue of amplifying noise such as internal microphone noise, which primarily is an issue in quiet sound environments, and therefore implying that the lower the sound pressure level, the more preference should be given to activating the BBF instead of applying a set of traditional monaural BFs. In a more specific embodiment the BBF may be disabled in response to the average sound pressure level exceeding a given threshold level.

According to a specifically advantageous embodiment the BBF may be configured such that it does not introduce a low-frequency roll-off for frequency ranges of interest for hearing aid system users, which is frequency ranges with a lower limit above 100 Hz. Hereby the issue of amplifying noise such as internal microphone noise is eliminated.

According to an embodiment the frequency dependent gain of a hearing aid compressor is set such that the relative level changes as a function of frequency, which are introduced by the BBF, are compensated in addition to alleviating a hearing deficit of an individual hearing aid system user, whereby the roll-on filter may be omitted.

In an embodiment, the classifier is configured to evaluate whether a measure of the fluctuations of the sound pressure level exceeds a given threshold, and in response hereto activate the BBF because the BBF according to the invention may be especially advantageous in highly fluctuating sound environments such as the cocktail party situation with multiple interfering speakers. According to a more specific embodiment, the measure of the fluctuations of the sound environment is given as the distance, in dB SPL, between a low percentile and a high percentile, such as e.g. the 10% percentile and the 90% percentile. In a more specific embodiment a measure of the fluctuations of the sound pressure level is determined in each of the hearing aids of the binaural hearing aid system and the difference between the two is determined in real time and in case the difference value exceeds a predetermined threshold the BBF is activated.

In another embodiment, the classifier may be configured to evaluate whether a desired sound source (typically a speaker) is located in front of the hearing aid user, or at least within say +/−45 degrees of the frontal direction, and activating the binaural beamforming if this is the case. In an embodiment, the classifier is configured to detect whether a speaker is located in front of the hearing aid user, by evaluating if the difference in the probability of speech, predicted by monaural speech detectors accommodated in the left and the right hearing aid respectively, is less than a predetermined threshold. According to an embodiment the monaural speech detector is implemented as disclosed in EP 2649812B1.

In another embodiment the classifier may be configured to evaluate the degree of correlation in the sound environment and in response hereto disabling the BBF or lower the preference for the BBF over traditional monaural BFs because the BFs may perform adequately in this type of environment and therefore be preferred in order to reduce power consumption by not having to transfer input signals between the hearing aids of the binaural hearing aid system. According to a more specific embodiment, the degree of correlation in the sound environment is determined by calculating the frequency domain cross-correlation of two input signals of the binaural hearing aid system.

In yet other embodiments, multiple conditions need to be fulfilled before the BBF is activated, disabled or changed. In a specific embodiment both a highly fluctuating sound environment and a speaker in front of the hearing aid system user need to be detected before the BBF is activated.

In a variation of the embodiments, the BBF is replaced by traditional monaural beam forming when the BBF is disabled in response to a sound environment classification.

In another variation the BBF is changed (instead of being disabled) to provide in both hearing aids a summation of the input signals from both hearing aids in response to a sound environment classification. This provides an omni-directional pattern with a generally improved signal-to-noise ratio because uncorrelated noise adds slower than correlated (desired) sound from a single sound source.

In yet another variation the BBF is changed (instead of being disabled) to provide in both hearing aids a summation of the output signals from traditional monaural beam formers from both hearing aids.

In an embodiment the BBF is only activated in a frequency range below a predetermined frequency threshold (that may also be denoted a cut-off frequency), wherein the predetermined threshold is selected from the range between 500 Hz and 2 kHz. It is advantageous only to activate the BBF in a limited lower frequency range because this can reduce the power consumption by minimizing the amount of data that has to be transmitted between the hearing aids of the binaural hearing aid system and because it has been found that the impact of having the ILD enhancing BBF in the high frequency range is relatively limited since the magnitude of the ILD generally increases with frequency.

According to a more specific embodiment the predetermined frequency threshold and hereby the BBF is changed, in real time, in response to a classification of the sound environment. According to an embodiment the frequency threshold is changed to a lower value in response to classifier determining that the degree of correlation in the sound environment exceeds a certain predetermined threshold because traditional monaural beam formers may perform adequately for a larger frequency range in this type of environment and therefore may be preferred in order to reduce power consumption by minimizing the amount of data that has to be transmitted between the hearing aids of the binaural hearing aid system.

According to a specific embodiment, the binaural hearing aid system consists of two hearing aids that do not include a BTE part. Generally, it is difficult to include a monaural beam former in such hearing aids because of the limited space available, but this disadvantage is to some degree compensated for due to the natural beam forming that the pinna of the ear provides, especially for higher frequencies. However, by applying the BBF of the present invention it becomes possible to provide beam forming also in the low frequency range for this type of hearing aid systems, whereby speech intelligibility may be improved.

In an embodiment the hearing aid compressor settings are synchronized between the hearing aids of the binaural hearing aid system, whereby the artificially increased ILDs may be maintained. In a more specific embodiment the synchronization is only carried out for the frequency range where the BBF is active.

In an embodiment at least two different inter-aural transfer function filters are derived whereby the BBF may cover a larger frequency range, by allowing a first inter-aural transfer function filter to cover a first frequency range and allowing a second inter-aural transfer function filter to cover a second frequency range.

According to still other variations, the present invention may be implemented in any audio device comprising a binaural set of acoustical-electrical input transducers and acoustical-electrical output transducers adapted to provide a perception of audio in a human being. Headsets, personal sound amplifiers and hearables are examples of such audio devices.

According to yet other variations, the hearing aid system needs not comprise a traditional loudspeaker as output transducer. Examples of hearing aid systems that do not comprise a traditional loudspeaker are cochlear implants, implantable middle ear hearing devices (IMEHD), bone-anchored hearing aids (BAHA) and various other electro-mechanical transducer based solutions including e.g. systems based on using a laser diode for directly inducing vibration of the eardrum.

Figure 4:
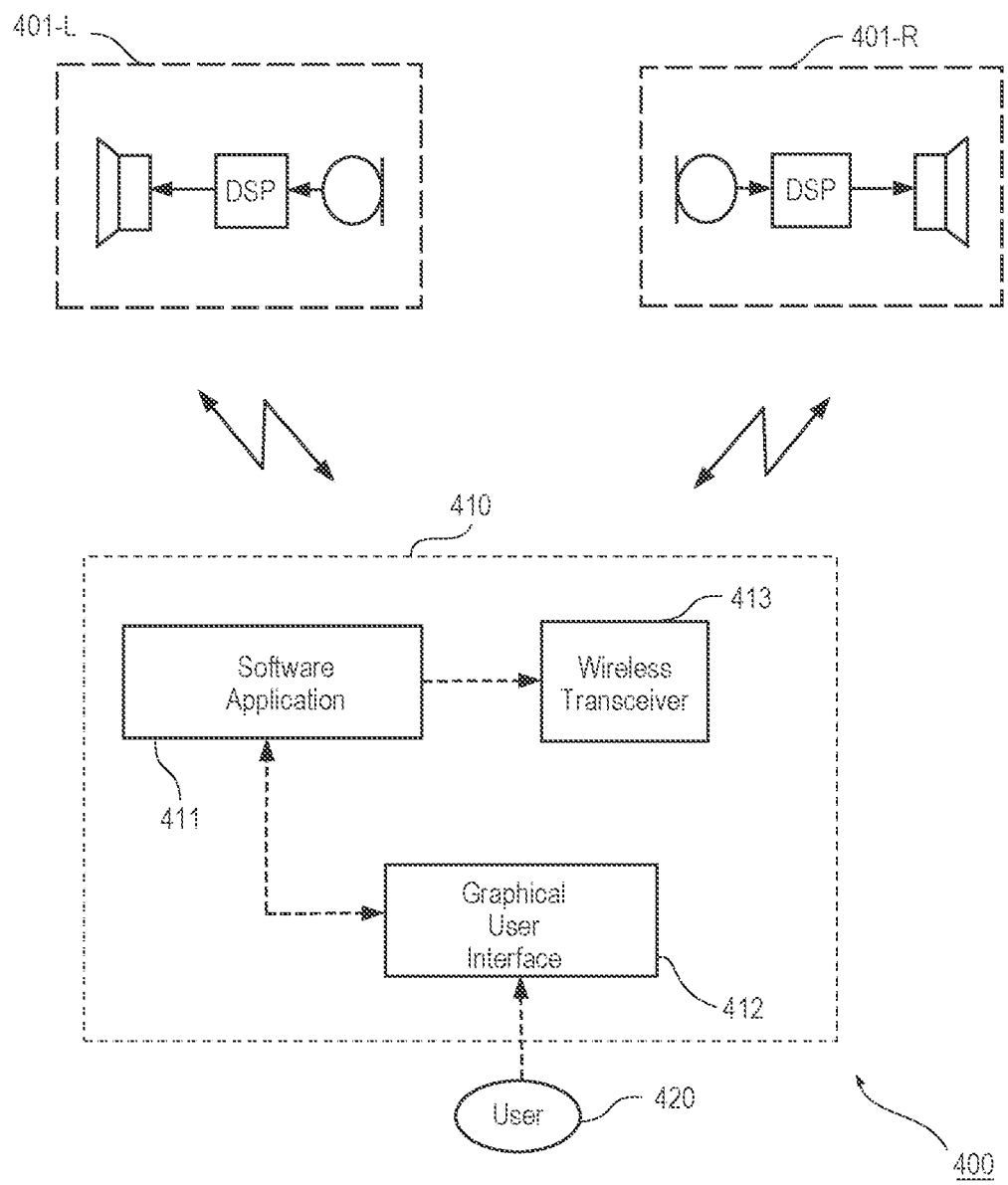
FIG. 4 illustrates highly schematically a binaural hearing aid system comprising an external device according to an embodiment of the invention.

Reference is now made to FIG. 4, which illustrates highly schematically a binaural hearing aid system 400 according to an embodiment of the invention. The binaural hearing aid system comprises in addition to a left and right hearing aid 401-L/-R a computerized device 410 comprising a software application 411, a graphical user interface 412, and a wireless transceiver 413 adapted to transmit a set of digital signals representing audio to the hearing aids 401-L/-R, for conversion of the digital signals into sound. FIG. 4 illustrates how a user 420 through the graphical user interface 412 may communicate interactively with the computerized device 410 in a manner controlled by the software application 411. The software application 411 is adapted to provide digital signals that represent a sound environment comprising a (desired) speaker in front of the binaural hearing aid system user and a multitude of interfering speakers.

Furthermore, the computerized device 410 is adapted to prompt the hearing aid system user 420 to determine a phrase uttered by the desired speaker, and in response to the answer provide feedback to the hearing aid system user 420 concerning speech intelligibility and at the same time storing the results for later use. Hereby the user can train his ability to take advantage of the increase ILD provided by the binaural hearing aid system according to the invention.

Figure 5:
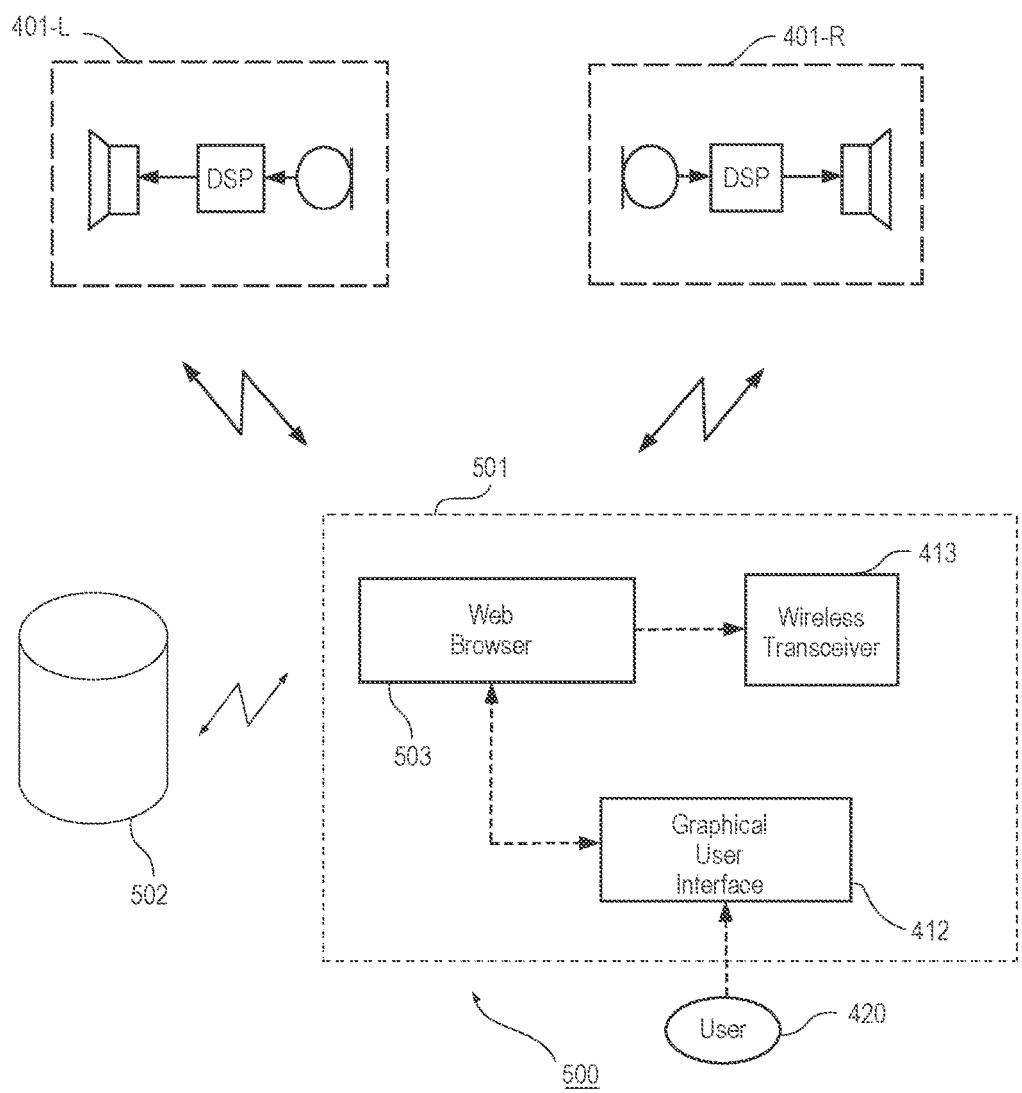
FIG. 5 illustrates highly schematically a binaural hearing aid system comprising an external device according to an embodiment of the invention.

Reference is now made to FIG. 5, which illustrates highly schematically a binaural hearing aid system 500 comprising a computerized device 501 and an external server 502 according to an embodiment of the invention. The computerized device 501 comprises basically the same elements as the computerized device 410 from the embodiment of FIG. 4, except in so far that the functionality, which in the embodiment of FIG. 4 is provided by the software application 411, in the embodiment of FIG. 5 is provided by a web service that is hosted on the external server 502 and may be accessed using the web browser 503. In yet another embodiment the web service may be accessed using a software application, that is not browser based.

In variations of the FIGS. 4 and 5 embodiments, the computerized device may be a smart phone, a tablet computer, a portable personal computer, smart watch or a stationary personal computer.

The invention claimed is:

1. A method of operating a binaural hearing aid system comprising, in each hearing aid of the binaural hearing aid system, the steps of:
   providing an ipse-lateral input signal from an input transducer accommodated in an ipse-lateral hearing aid of the binaural hearing aid system;
   providing a contra-lateral input signal by wirelessly receiving an input signal from an input transducer accommodated in a contra-lateral hearing aid of the binaural hearing aid system; and
   combining the ipse-lateral and the contra-lateral input signal in order to provide a spatially processed signal;
   wherein the spatially processed signal is configured to provide a lower sensitivity for sounds incident from the direction towards the contra-lateral hearing aid as opposed to sounds incident from the directly opposite direction.

2. The method according to claim 1, wherein the steps of combining the ipse-lateral and the contra-lateral input signals in order to provide the spatially processed signal is based on constructive and destructive interference between signals at least derived from the ipse-lateral input signal and the contra-lateral input signal.

3. The method according to claim 1, wherein the provided sensitivity, as a function of the direction of sound incidence, is fixed.

4. The method according to claim 1, wherein the sensitivity, as a function of the direction of sound incidence, for the ipse-lateral hearing aid relative to the contra-lateral hearing aid is symmetrical around a line in the horizontal plane that is perpendicular to the line connecting the hearing aids.

5. The method according to claim 1, comprising the step of:
providing in both the ipse-lateral and the contra-lateral hearing aid a sensitivity as a function of the direction of sound incidence, which provides a level difference of the spatially processed signal in respectively the ipse-lateral and the contra-lateral hearing aid, which is increased beyond that provided naturally by the head shadow of the hearing aid system user, whereby the inter-aural level difference is artificially increased.

6. The method according to claim 1, wherein the step of combining the ipse-lateral and the contra-lateral input signals in order to provide the spatially processed signal is only carried out for a frequency range below a predetermined cut-off frequency, wherein the predetermined cut-off frequency is in the range between 500 Hz and 2 kHz.

7. The method according to claim 1, wherein the step of combining the ipse-lateral and the contra-lateral input signals in order to provide the spatially processed signal comprises the step of:
providing the difference signal between the ipse-lateral input signal and the contra-lateral input signal or a signal derived from the contra-lateral input signal.

8. The method according to claim 1, wherein the step of combining the ipse-lateral and the contra-lateral input signals in order to provide the spatially processed signal comprises the step of:
filtering the contra-lateral input signal or the ipse-lateral input signal in an inter-aural transfer function filter and hereby providing a filtered contra-lateral input signal or a filtered ipse-lateral input signal.

9. The method according to claim 8, comprising the step of:
providing a sound source on the line intersecting the two hearing aids of the binaural hearing aid system and at a point situated at least a predetermined distance from the hearing aid system;
optimizing at least one parameter of the inter-aural transfer function, in order to minimize the spatially filtered signal, wherein the parameter represents the distance between the hearing aids of the binaural hearing aid system and whereby the distance between the hearing aids of the binaural hearing aid system may be estimated.

10. The method according to claim 1, comprising the step of:
varying adaptively the sensitivity, as a function of the direction of sound incidence, in order to improve the signal-to-noise ratio of the spatially processed signal as long as the spatially processed signal provides a lower sensitivity for sounds incident towards the direction of the contra-lateral hearing aid as opposed to sounds incident from the directly opposite direction.

11. The method according to claim 10, wherein the step of varying adaptively the sensitivity, as a function of the direction of sound incidence, is carried out under the constraint that the sensitivity, as a function of sound incidence, for the ipse-lateral hearing aid relative to the contra-lateral hearing aid remains symmetrical around a line in the horizontal plane that is perpendicular to the line connecting the hearing aids.

12. The method according to claim 10, wherein the step of varying adaptively the sensitivity, as a function of the direction of sound incidence, in order to improve the signal-to-noise ratio of the spatially processed signal comprises the step of:
varying adaptively the position of a virtual sound source required in order to obtain the left and right head related transfer functions, which are used to derive the transfer function for an inter-aural transfer function filter configured to filter the contra-lateral input signal.

13. The method according to claim 1, comprising the further step of:
using the spatially processed signal as input to a further processing adapted to alleviate a hearing deficit of an individual binaural hearing aid system user.

14. The method according to claim 1,
wherein the step of providing an ipse-lateral input signal comprises the step of combining a signal from a first and a second input transducer accommodated in an ipse-lateral hearing aid of the binaural hearing aid system using monaural beamforming, and
wherein the step of providing a contra-lateral input signal comprises the step of combining a signal from a third and a fourth input transducer accommodated in a contra-lateral hearing aid of the binaural hearing aid system using monaural beamforming.

15. A binaural hearing aid system comprising two hearing aids, wherein each hearing aid comprises an acoustical-electrical input transducer, a binaural beam former, a digital signal processor, an electrical-acoustical output transducer and a wireless transceiver adapted to exchange signals with a contra-lateral ear-device of the binaural system,
wherein the binaural beam former is adapted to provide a spatially processed signal; and
wherein the spatially processed signal is configured to provide a lower sensitivity for sounds incident from the direction of the contra-lateral ear device as opposed to sounds incident from the directly opposite direction.

16. The binaural hearing aid system according to claim 15, wherein each hearing aid comprise at least two acoustical-electrical input transducers and wherein the input signals for the binaural beam former results from monaural beam forming of the electrical signals from the at least two acoustical-electrical input transducers.

17. The binaural hearing aid system according to claim 15, wherein the provided sensitivity, as a function of the direction of sound incidence, is fixed.

18. The binaural hearing aid system according to claim 15, comprising a filter bank adapted to provide a multitude of frequency bands and wherein the binaural beam former is adapted to only function for frequency bands having a center frequency below a pre-determined cut-off frequency in the range between 500 Hz and 2 kHz.

19. The binaural hearing aid system according to claim 15, wherein the binaural beam former is adapted to provide a difference signal between the ipse-lateral input signal and the contra-lateral input signal, or a signal derived from the contra-lateral input signal, and adapted to derive the spatially processed signal from the difference signal.

20. The binaural hearing aid system according to claim 15, wherein the binaural beam former comprises:

an inter-aural transfer function filter adapted to provide a filtered contra-lateral input signal or a filtered ipse-lateral input signal.

21. The binaural hearing aid system according to claim 20, wherein the binaural beam former is configured to varying adaptively the sensitivity, as a function of a direction of sound incidence, in order to improve the signal-to-noise ratio of the spatially processed signal by adaptively varying a direction of incidence parameter of an inter-aural transfer function that the inter-aural transfer function filter is based upon.

\* \* \* \* \*